G. C. WESTBY.
PROCESS FOR THE TREATMENT OF ORES.
APPLICATION FILED JAN. 12, 1917.
1,244,811.
Patented Oct. 30, 1917.
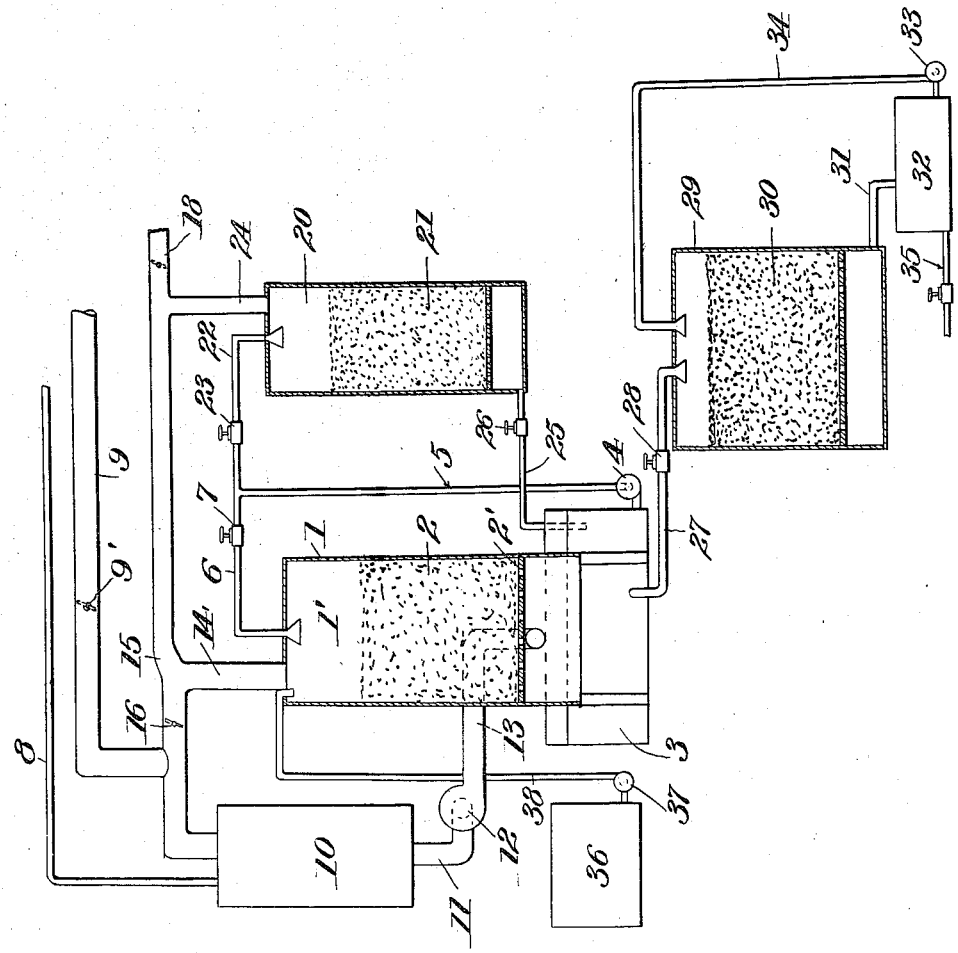

UNITED STATES PATENT OFFICE.

GEORGE CUTLER WESTBY, OF LUDWIG, NEVADA, ASSIGNOR TO WESTERN PROCESS COMPANY, A CORPORATION OF MAINE.

PROCESS FOR THE TREATMENT OF ORES.

1,244,811.     Specification of Letters Patent.     Patented Oct. 30, 1917.

Application filed January 12, 1917. Serial No. 142,082.

*To all whom it may concern:*

Be it known that I, GEORGE C. WESTBY, a citizen of the United States, residing at Ludwig, in the county of Lyon and State of Nevada, have invented a new and useful Improvement in Processes for the Treatment of Ores, of which the following is a specification.

My invention relates to a process for the treatment of ores, and more particularly those of copper, zinc, nickel, cadmium and silver for the extraction of metal values therefrom.

In accordance with my process I effect the extraction of the metal values from the ore by a wet process wherein the ore is subjected to the combined action of gases and fluids in such manner that the metal values are converted into a soluble form and removed from the inert material of the ore. This I accomplish by subjecting the ore to said gases, acids, and such intermediate compounds as are formed in the presence of the ore, and effecting a leaching of the thus treated ore.

The objects of my invention are to effect the efficient separation of the metal values from the ore with the latter in a relatively coarse state; to effect their separation at a low temperature and with the addition of little or no heat from external sources; to provide for regeneration of a part of the reagents used in the course of the process and to minimize the loss thereof as far as possible, and such other objects as will hereinafter further appear.

In carrying out my process I subject the ore to be treated to the action of gases which will convert the metal values of the ore into soluble form, these gases being formed wholly or in part in the nascent state by the reaction of the reagents used in the presence of the ore body. The specific application of the process is determined largely by the characteristics of the ore; in the case of ores of copper, zinc, nickel, cadmium and silver I find it best to conduct the process in such manner as to produce only sulfates of the metals.

In some cases I find it advisable and economical to subject the ore to a preliminary treatment before proceeding with the extraction proper of the ore. This is especially the case where the ore contains lime or carbonates to any considerable extent, as I have found that these substances interfere with both the economy and efficiency of my process, for example, by forming an insoluble coating of calcium sulfate on the ore particles, wasting reagents in the formation of carbon dioxid, the consequent dilution of the gaseous reagents, etc.

Thus, in treating a calcareous cupriferous sulfid, before subjecting the same to my process for the extraction of the copper values therefrom, I add thereto a cold, dilute solution of nitric acid or hydrochloric acid. The resulting solution, which contains the calcium as calcium nitrate in the former case, is removed and treated with a cheap by-product sulfate such as the ferrous sulfate formed in the copper precipitation boxes, or the impure sulfuric acid produced in excess in the subsequent treatment of the ore. This results in the precipitation of calcium sulfate and in the formation of a nitrate containing solution. This solution is decanted and is subsequently used in the treatment of the ore.

The precipitated calcium sulfate, after decanting the nitrate solution, may be returned to the ore from which the metal values have been removed, and adheres thereto, for the purpose of cleaning it therewith.

By the above described treatment I also effect the elimination of carbon dioxid, which might interfere with the subsequent treatment of the ore, and would waste reagents and dilute the gaseous reagent used in the process. By my preliminary treatment not only do I eliminate the lime and carbon dioxid, but I also regenerate the nitrate reagent in a form available for use in the subsequent ore treatment, and use for the purpose only the cheapest by-product reagents.

The ore which has been subjected to the above preliminary treatment is next treated by me in the same manner as other copper sulfid ores. For such ores I conduct my process as follows:

I charge the ore in a crushed, not pulverized, state into towers or series of towers of acid-resistant material. Since I do not use a high temperature in my process I am able to use wood in the construction of these towers. The towers are provided with means for the retention of the ore therein and are set in a sump tank which acts as a gas seal for the towers. This tank is filled with an acid or acidulated liquor containing nitric acid or nitrates, and which may, when a calcareous ore is treated, consist in part of the nitrate liquor decanted from the calcium sulfate formed in the preliminary treatment of the ore.

The liquor in the sealing tank, which is ordinarily sufficiently heated by the reactions of the process, may be heated by extraneous means if found desirable. This hot liquor is continuously pumped to the top of the tanks and is sprayed over the ore charge, through which I cause it to percolate at a rate which I regulate in such manner as to permit a comparatively free passage of the reacting gases through the interstices of the ore charge. At the same time oxygen is passed upward through the ore charge in properly regulated amounts.

I find that on operating in this manner sulfates of the copper or these metals present are produced, by the action of the solution acid with nitric acid and containing nitrates on the sulfids of the ore, perhaps due to or accelerated by the presence of the nitrous gases evolved, the free oxygen and the ore mass itself. The oxygen furthermore combines with the nitrous gases evolved, oxidizing them to nitrogen peroxid which is in turn dissolved in the descending aqueous liquor, thus regenerating the nitric acid. This action of formation of nitrous gases, their oxidation and hydration is continually repeated as the fluid passes downward through the ore body, a continuous regeneration of nitric acid being thus effected.

It has also been found that by maintaining a moderately large inclosed space above the ore bodies in the treatment towers the formation of nitrogen peroxid and of nitric acid is promoted. I also achieve the same result by interposing oxidizing and condensing towers in the system or between reaction towers.

Where the quantity of sulfid present in the ore or ore mixture treated is found insufficient for the production of a proper amount of sulfatizing reagents, I may add thereto other sulfur bearing material, such as pyrites or the like.

I also find it advisable to provide for the admission of sulfur dioxid into the reacting mass. In the presence of free oxygen, the nitrous gases and the ore mass this is converted into sulfuric anhydrid, which is hydrated by the descending liquor to sulfuric acid. This acid in turn reacts with the nitrates in the solution to form nitric acid, which in turn reacts upon the ore as above described. The sulfuric acid also tends to react with the metal values of the ores to form sulfates. In this manner I prevent the formation of an excessive amount of nitrates and regenerate the acid therefrom.

By using oxygen rather than air as the oxidizing agent I am able to avoid an excessive dilution of active gaseous reagents, promote the regeneration of nitric acid, accelerate the reaction with the ore and prevent a large accumulation of inert gas. I am thus able to maintain a closed gas circuit. I find that it is usually necessary, however, to use a system of absorption towers to eliminate residual carbon dioxid and such nitrogen as may be unavoidably admitted with the sulfur dioxid, when used. I cause a part or all of the gases escaping from the reaction towers to pass through these absorption towers, discharging the unabsorbed carbon dioxid and nitrogen and thereby prevent appreciable increase in the gas volume in the circuit.

The solution may be repeatedly passed through the same body of ore through successive bodies of ore in series to exhaust the ore of its metal values. As each body of ore becomes exhausted the supply of oxygen and sulfur dioxid is cut off, and the nitrous gases, which are no longer oxidized, are passed into an unexhausted body or ore under treatment, or is passed into an absorption tower in which it is oxidized, hydrated and dissolved in the same manner as in the ore bodies.

The solution derived from the ore treatment is heavily charged with sulfates, sulfuric acid and possibly some nitric acid. The acid is neutralized as far as possible on the ore itself, and is finally passed through a tower containing cleaned sulfid or pyritic material to which no air or oxygen has access. In this way the nitrous gases contained in the material, such as nitric oxid, etc., is driven off and are recovered in the manner described in the preceding paragraph.

The resulting solution, which is now acid with sulfuric acid, may be discharged, after dilution, on oxidized ores to extract therefrom metal values as soluble sulfates, or may be directly treated for the reduction of the ferric sulfate, neutralization of the sulfuric acid, precipitation of the copper, etc., in the most suitable manner.

Suitable mechanical means may be provided for transporting the gases and liquids, such as acid proof fans and pumps, and also for discharging the ore at the bottoms of the towers and for feeding it at the tops. I have found that the extraction is more rapid and complete the lower the zone of ore considered, and consequently I may continuously remove exhausted ore from the bottoms of the columns and feed fresh ore at the tops.

In the accompanying drawing I have illustrated diagrammatically an apparatus by means of which my process may be carried out. In this I indicate a reaction chamber into which the mixed or sulfid ore 2 is charged and which has a relatively large space 1' above the charge of ore. This reaction chamber is provided with a suitable support 2' for the ore and has an open bottom, being sealed by the liquid in the sump tank 3. This liquid, which has percolated through the mass of ore, may be forced by pump 4 through conduit 5 and returned to the top of the reaction chamber through pipe 6 provided with valve 7.

Oxygen or oxygen containing gas is supplied through pipe 8 and a supply main 9 for sulfur dioxid or sulfurous gas provided with a cut-off valve 9' is also provided. 10 is a gas reservoir which also serves as a mixing chamber for oxygen containing gas and the sulfur dioxid when the latter is used. The gas is drawn from the reservoir 10 through conduit 11 by means of blower 12 and is forced through conduit 13 into the reaction chamber 1 below the ore mass 2. It rises through the ore mass in counter current to the descending column of acid liquor supplied through pipe 6. The gas escapes from the top of the reaction chamber through conduit 14, from which it may pass through pipe 15 provided with check valve 16 to return to chamber 10 and again be used in the reaction chamber, or it may pass through pipe 17 provided with cut-off valve 18 to the absorption chambers. The operation of the valves 16 and 18 is obviously dependent upon the will of the operator.

20 is the tower for cleaned sulfids or pyrites 21, the function of which is to remove the nitrous gases from the liquid passing through the ore body in the chamber 1'. The conduit 5 leading from the sump 3 is provided with a branch pipe 22 having cut-off valve 23, and which discharges the liquid from the sump into the body of sulfids contained in chamber 20. It percolates through the sulfids and returns through pipe 25 provided with valve 26 to the tank 3. The gases evolving in the tower 20 pass through the gas pipe 27 at the top of the tower into the pipe 17, from which they may be returned to the reservoir 10 or may pass into the absorption chambers in an obvious manner.

After the liquid in the tank 3 has reached the desired concentration of metal values and has been freed of nitrous gases by passage through the sulfids 21 it may be discharged through pipe 27 provided with valve 28 into the body of oxid ores 30 contained in the chamber 29, in passing through which it extracts metal values therefrom and is neutralized thereby. The liquid percolating through these oxid ores is discharged into receiving tank 32, from which it may be returned to the top of the oxid ore chamber 29 by pump 33 and pipe 34, or may be discharged to a suitable precipitation system through pipe 35.

Liquor derived from the preliminary treatment of calcareous ores with nitric acid is treated for the precipitation of calcium sulfate, as has already been described, and is placed in tank 36. This tank may also be supplied merely with weak acid. The liquid therein is forced by pump 37 through pipe 38 to the top of the reaction chamber 1 in which it descends through the ore body together with the liquid returned from the sump.

Having thus described my invention what I claim as new and desire to secure by Letters Patent is:—

1. The process of treating sulfid containing ore mixtures comprising passing an acid nitrate containing solution through the ore mixture and to a gaseous oxygen containing reagent in counter current thereto, thereby continuously oxidizing the nitrous gases formed and regenerating nitric acid.

2. The process of treating sulfid containing ore mixtures comprising passing an acid nitrate containing solution through the ore mixture and to a gaseous oxygen containing reagent in counter current thereto, thereby continuously oxidizing the nitrous gases formed and regenerating nitric acid in the solution and causing the solution to pass in like manner repeatedly through the ore.

3. The process of treating sulfid containing ore mixtures comprising subjecting the ore mixture in an inclosed space to the action of a descending current of acid nitrate containing solution, causing a gaseous oxygen containing reagent to pass through said ore mixture in counter-current thereto, thereby oxidizing the nitrous gases formed and regenerating nitric acid in the descending current of liquid, repeating the passage of the liquid through the ore body in the presence of the gaseous reagent until the ore mixture is exhausted, removing the liquid and extracting the metal values therefrom.

4. The process of treating sulfid containing ore mixtures comprising passing an acid nitrate containing solution through the ore mixture and to a countercurrent of a gas containing sulfur dioxid and oxygen, thereby continuously regenerating nitric acid in the solution and forming sulfuric acid.

5. The process of treating sulfid containing ore mixtures comprising passing an acid nitrate containing solution through the ore mixture and to a counter-current of a gas containing sulfur dioxid and oxygen, thereby continuously regenerating nitric acid in the solution and forming sulfuric acid, and causing the solution to pass repeatedly through the ore, thereby extracting the metal values as sulfates.

6. The process of treating sulfid containing ore mixtures comprising subjecting the ore mixture in an inclosed space to the action of a descending current of an acid nitrate containing solution, causing a gaseous mixture of sulfur dioxid and oxygen in countercurrent thereto, thereby regenerating nitric acid in the solution and forming sulfuric acid, causing the solution to pass repeatedly through the ore body in the presence of the gaseous mixture until the ore body is exhausted, removing the liquid, and extracting the metal values therefrom.

7. The process of treating sulfid containing ore mixtures comprising subjecting the ore mixture in an inclosed space to the action of a descending current of an acid nitrate containing solution, causing a gaseous oxygen containing mixture to pass in countercurrent thereto through the ore mixture, thereby oxidizing the nitrous gases formed and regenerating nitric acid in the descending current of liquid, repeating the passage of the liquid through the ore body in the presence of the gaseous reagent until the ore mixture is exhausted, removing the liquid, removing the nitrous gases therefrom and extracting the metal values from the solution.

8. The process of treating sulfid containing ore mixtures comprising subjecting the ore mixture in an inclosed space to the action of a descending current of an acid nitrate containing solution, causing a gaseous oxygen containing mixture to pass in countercurrent thereto through the ore mixture, thereby oxidizing the nitrous gases formed and regenerating nitric acid in the descending current of liquid, repeating the passage of the liquid through the ore body in the presence of the gaseous reagent until the ore mixture is exhausted, removing the liquid, passing the liquid through a body of sulfid, thereby driving off nitrous gases therefrom, and extracting the metal values from the solution.

9. The process of treating sulfid containing ore mixtures comprising subjecting the ore mixture in an inclosed space to the action of a descending current of an acid nitrate containing solution, causing a gaseous oxygen containing mixture to pass in countercurrent thereto through the ore mixture, thereby oxidizing the nitrous gases formed and regenerating nitric acid in the descending current of liquid, repeating the passage of the liquid through the ore body in the presence of the gaseous reagent until the ore mixture is exhausted, removing the liquid, passing the liquid through a body of cleaned sulfid thereby driving off nitrous gases therefrom, oxidizing the nitrous gases and returning them to the further treatment of ore, and extracting the metal values from the solution.

10. The process of treating sulfid containing ore mixtures comprising subjecting the ore mixture in an inclosed space to the action of a descending current of an acid nitrate containing solution, causing a gaseous mixture of sulfur dioxid and oxygen to pass in countercurrent thereto, thereby regenerating nitric acid in the solution and forming sulfuric acid, causing the solution to pass repeatedly through the ore body in the presence of the gaseous mixture until the ore body is exhausted, removing the liquid, removing the nitrous gases therefrom and extracting the metal values.

11. The process of treating sulfid containing ore mixtures comprising subjecting the ore mixture in an inclosed space to the action of a descending current of an acid nitrate containing solution, causing a gaseous mixture of sulfur dioxid and oxygen to pass in countercurrent thereto, thereby regenerating nitric acid in the solution and forming sulfuric acid, causing the solution to pass repeatedly through the ore body in the presence of the gaseous mixture until the ore body is exhausted, removing the liquid, passing it through a body of sulfid, thereby driving off the nitrous gases therefrom, and extracting the metal values from the solution.

12. The process of treating sulfid containing ore mixtures comprising subjecting the ore mixture in an inclosed space to the action of a descending current of an acid nitrate containing solution, causing a gaseous mixture of sulfur dioxid and oxygen to pass in countercurrent thereto, thereby regenerating nitric acid in the solution and forming sulfuric acid, causing the solution to pass repeatedly through the ore body in the presence of the gaseous mixture until the ore body is exhausted, removing the liquid, passing it through a body of cleaned sulfid, thereby driving off nitrous gases therefrom, oxidizing the nitrous gases and returning them to the further treatment of ore, and extracting the metal values from the solution.

13. The process of treating calcareous sulfid ores, comprising subjecting said ores to the action of a dilute nitric acid solution, removing the solution, precipitating the calcium therefrom as sulfate and removing the same, and leaching the treated ore body with the acid solution remaining after removal of the sulfate while passing therethrough a countercurrent of oxygen containing gas.

14. The process of treating calcareous sulfid ores, comprising subjecting said ores to the action of a dilute nitric acid solution, removing the solution, precipitating the calcium therefrom as sulfate and removing the same, and leaching the treated ore body with the acid solution remaining after removal of the sulfate while passing therethrough a current of gas containing oxygen and sulfur dioxid.

15. The process of treating calcareous sulfid ores, comprising subjecting said ores to the action of a dilute nitric acid solution, removing the solution, precipitating the calcium therefrom as sulfate and removing the same, and leaching the treated ore body with the solution remaining after removal of the sulfate while passing therethrough a current of gas containing oxygen and sulfur dioxid, repeating such leaching to completely exhaust the ore, removing the nitrous gases therefrom, and removing the metal values.

16. The process of ore treatment comprising subjecting said ores to the action of a hot acid, nitrate containing solution and to a gas containing oxygen, thereby forming sulfate and regenerating nitrous gases, precipitating from the resultant solution insoluble sulfates such as lead sulfate, passing the solution through sulfids to remove nitrous gases, passing the resulting acid sulfate solution through oxidized ore, and separating from the liquid the metal values therein.

GEORGE CUTLER WESTBY.